(12) United States Patent
Pedersen et al.

(10) Patent No.: US 11,059,184 B2
(45) Date of Patent: Jul. 13, 2021

(54) GRIPPER DEVICE AND A METHOD FOR PICKING UP AND RE-POSITIONING AN ITEM CARRIED BY A SUPPORT SURFACE

(71) Applicant: Marel A/S, Aarhus (DK)

(72) Inventors: Bjørn Heide Pedersen, Randers (DK); Michael Tjørnelund, Randers (DK)

(73) Assignee: MAREL A/S, Aarhus N (DK)

( * ) Notice: Subject to any disclaimer, the term of this patent is extended or adjusted under 35 U.S.C. 154(b) by 7 days.

(21) Appl. No.: 16/474,205

(22) PCT Filed: Dec. 28, 2017

(86) PCT No.: PCT/EP2017/084733
§ 371 (c)(1),
(2) Date: Jun. 27, 2019

(87) PCT Pub. No.: WO2018/122323
PCT Pub. Date: Jul. 5, 2018

(65) Prior Publication Data
US 2020/0122338 A1   Apr. 23, 2020

(30) Foreign Application Priority Data

Dec. 30, 2016 (DK) .......................... PA 2016 71066

(51) Int. Cl.
*B66C 15/00* (2006.01)
*B25J 11/00* (2006.01)
(Continued)

(52) U.S. Cl.
CPC ....... *B25J 15/0028* (2013.01); *B25J 11/0045* (2013.01); *B25J 15/0206* (2013.01); *B65G 47/90* (2013.01)

(58) Field of Classification Search
CPC B25J 15/0028; B25J 15/0206; B25J 11/0045; B65G 47/90
(Continued)

(56) References Cited

U.S. PATENT DOCUMENTS 3,001,812 A * 9/1961 Anderson ................. B66C 1/30
                                                      294/67.31
3,013,517 A * 12/1961 Isham ...................... B63B 21/54
                                                      294/110.1
(Continued)

FOREIGN PATENT DOCUMENTS

EP       2168892 A1     3/2010
EP       2394936 A1    12/2011
(Continued)

OTHER PUBLICATIONS

Danish Search Report from DK Application No. PA 2016 71066, dated May 9, 2017.
(Continued)

*Primary Examiner* — Paul T Chin
(74) *Attorney, Agent, or Firm* — Workman Nydegger (57) ABSTRACT

This invention relates to a pick and place gripper device and a method for picking up and re-positioning an item carried by a support surface. The gripper device includes a base, at least one jaw pivotally mounted to the base having at least one leading edge, at least one belt of flexible material being wrapped around at least the leading edge of the at least one jaw such that it is sandwiched between the at least one jaw and the item when the at least one jaw penetrates below the item and as the at least one jaw moves below the item there is substantially no relative sliding movement between the sandwiched portion of the at least one belt and the item, wherein the leading edge of the at least one jaw, when coming into contact with the support surface, is configured
(Continued)

to adjust to the support surface when penetrating between the item and the support surface.

14 Claims, 7 Drawing Sheets

(51) Int. Cl.
    *B25J 15/00*     (2006.01)
    *B25J 15/02*     (2006.01)
    *B65G 47/90*     (2006.01)

(58) Field of Classification Search
    USPC .................................. 294/86.4, 116
    See application file for complete search history.

(56) References Cited

U.S. PATENT DOCUMENTS

| | | | | |
|---|---|---|---|---|
| 5,024,575 | A * | 6/1991 | Anderson | B65G 47/90 294/2 |
| 5,026,104 | A * | 6/1991 | Pickrell | B65F 3/046 294/106 |
| 5,398,983 | A * | 3/1995 | Ahrens | B65F 3/02 294/106 |
| 8,287,015 | B2 * | 10/2012 | Hawes | B65G 47/90 294/86.4 |
| 2009/0074549 | A1 | 3/2009 | Binder et al. | |
| 2009/0317221 | A1 * | 12/2009 | Hawes | B25J 15/0253 414/618 |
| 2012/0086226 | A1 * | 4/2012 | Weber | B25J 11/0045 294/81.54 |
| 2012/0146350 | A1 * | 6/2012 | Weber | B25J 15/0266 294/81.54 |
| 2012/0161459 | A1 * | 6/2012 | Weber | B25J 15/0266 294/106 |
| 2013/0033049 | A1 * | 2/2013 | Lang | B25J 15/0014 294/67.2 |
| 2019/0270205 | A1 * | 9/2019 | Stenbom | B65B 5/08 |

FOREIGN PATENT DOCUMENTS

| | | |
|---|---|---|
| JP | 2007222153 A | 9/2007 |
| WO | 2005002797 A1 | 1/2005 |
| WO | 2007093774 A1 | 8/2007 |
| WO | 2008135720 A1 | 11/2008 |
| WO | 2010105832 A1 | 9/2010 |
| WO | 2016177540 A1 | 11/2016 |

OTHER PUBLICATIONS

International Search Report from PCT Application No. PCT/EP2017/084733, dated Mar. 29, 2018.

* cited by examiner

GRIPPER DEVICE AND A METHOD FOR PICKING UP AND RE-POSITIONING AN ITEM CARRIED BY A SUPPORT SURFACE

FIELD OF THE INVENTION

The present invention relates to gripper device and a method for picking up and re-positioning an item carried by a support surface.

BACKGROUND OF THE INVENTION

Figure 1:
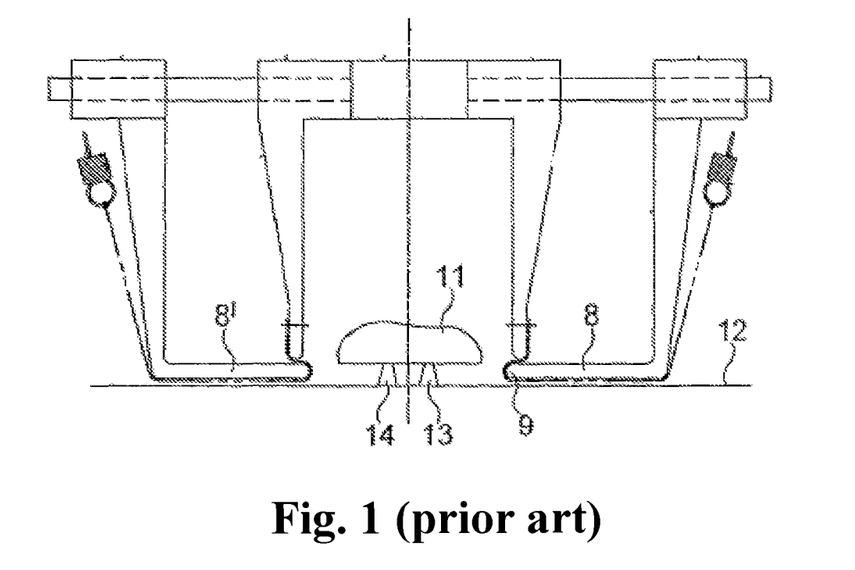
FIG. 1 shows a prior art gripper device.

WO2007093774 discloses a pick and place device for picking up and re-positioning an article carried by a support surface. As shown in FIG. 1, the device comprises a first part which includes a plate portion (8, 8'), which is movable parallel to a conveyor belt (12) so that a leading edge thereof penetrates below the article (11), between the article and the conveyor belt to assist the plate portions (8, 8') in getting underneath the article with a minimum disruption that halt has raised rips (13, 14). A belt of flexible material (9, 9') is provided which is wrapped around at least the leading edge of the plate portion so that it is sandwiched between the plate and the article when the former penetrates there below and as the plate portion moves below the article there is substantially no relative sliding movement between the sandwiched portion of the belt and the article.

Although this pick and place device shows significant advantages over prior art grippers it is too spacious and thus there is a demand to make the pick and place device more compact and thus capable of enhancing the throughput of the processing, e.g. to create batches with fixed target in trays. Moreover, the ability of this pick and place device to pick up articles that are resting on a support surface that is not completely flat, and e.g. contains partly skewed portion, is limited if not impossible.

SUMMARY OF THE INVENTION

On the above background it is an object of embodiments of the present invention to provide an improved pick and place device where the throughput of the processing may be enhanced.

In general, the invention preferably seeks to mitigate, alleviate or eliminate one or more of the above mentioned disadvantages of the prior art singly or in any combination. In particular, it may be seen as an object of embodiments of the present invention to provide a pick and place device that solves the above mentioned problems, or other problems.

To better address one or more of these concerns, in a first aspect of the invention a pick and place gripper device is provided for picking up and re-positioning an item carried by a support surface, comprising:

a base, at least one jaw pivotally mounted to the base having at least one leading edge, at least one belt of flexible material being wrapped around at least the leading edge of the at least one jaw such that it is sandwiched between the at least one jaw and the item when the at least one jaw penetrates below the item and as the at least one jaw moves below the item there is substantially no relative sliding movement between the sandwiched portion of the at least one belt and the item, wherein the leading edge of the at least one jaw, when coming into contact with the support surface, is configured to adjust to the support surface when penetrating between the item and the support surface.

Accordingly, the adjustment of the leading edge, when coming into contact with the support surface, causes a scraping effect and thus it is ensured that the at least one jaw penetrates beneath the item to be picked up.

Moreover, the fact that the leading edge adjusts to the support surface, results in that the item can easily be picked up, although the support surface is not necessarily completely flat and may e.g. have some irregularities, skewed portions etc.

Also, since it is the support surface that interacts with the leading edge the at least one jaw may be shaped such that it is compact and less spacious and thus the spacing between adjacent items may be reduced, which obviously results in higher throughput.

The at least one jaw may be a single piece that may e.g. be, but is not limited to, printed by a 3 Dimensional (3D) printer, i.e. the at least one jaw may be a single piece 3D solid object that is printed typically be a digital file. Moreover, in one embodiment the 3D solid object may have different stiffness where e.g. the stiffness at or around the at least one leading edge is more flexible compared to the remaining part of the at least one jaw, e.g. compared to the part of the at least one jaw that is pivotally mounted to the base, so as to obtain the above mentioned scraping effect.

In one embodiment, the at least one jaw comprises a first part and a second part interconnected together, the first part including a front section defining the leading edge of the at least one jaw. The first and the second parts may in one embodiment be pivotally connected together, where in one embodiment the first and the second parts may be connected together via a spring load for supplying spring load force around the pivotal connection between the first and the second parts such that the front section of the first part has a tendency to point away from the base to an open gripper position. Put in other words, by bending the first part in relation to the second part, e.g. via interaction with the support surface or any other type of an external force, such that it moves towards being parallel or substantially parallel to the support surface an elastic potential energy is put into the spring load. Upon releasing the external force load the elastic potential energy is released as a kinetic energy of the first part when it is moved back to it's original position.

To counteract to this, the second part comprises in one embodiment means configured to interact with the first part so as to provide a counter force opposite to the spring force. This counter force may be provided while the gripper device is in an "open position" to ensure that the first part is in a pre-defined angular position in relation to the support surface (assuming the gripper device is arranged directly above in non-angular position, i.e. parallel to the support surface). Also, the counter force is provided when the gripper device is in a "closed position", i.e. subsequent to picking up the item, to ensure that the first part provides a support for the item while picking it up until re-positioning the item, i.e. preventing it from moving back to the "open position". As will be discussed in more details later, any type of a driving unit is provided for moving the at least one jaw from the "open position" to the "closing position", and vice versa, but this driving unit provides also the force needed in preventing the at least one jaw from moving back to the "open position" subsequent to the step of picking the item up.

The closing position where the item is being carried may be understood as a locked position, where one or more pins or similar lock the at least one jaw and prevent it from moving towards the open position.

In one embodiment, the second part comprises opposingly arranged arm-like structures having free ends for pivotally connecting the second part to the first part, and where the means configured to interact with the first part so as to provide the counter force opposite to the spring force comprises at least one part which is outwardly protruding from the second part and configured to interact with the rear section of the first part.

The arrangement of the means configured to interact is preferably such that it provides a counter force at all times, except when external forces such as a manual force from a person or a force from the support surface is exerted onto the at least one jaw, i.e. in this case onto the first part.

In one embodiment, at least a part of the front section extending from the leading edge may comprise a flat plate structure, where the flat plate structure may be a stiff structure or a structure made of stiff material.

The location of the means configured to interact, e.g. the at least one outwardly protruding part, is preferably such that in a "rest position"/"open position" of the gripper device, i.e. a position where no external forces such as from the support surface are exerted on the gripper device, the means configured to interact provides a counter force to the spring load such that the first part, or the flat plate structure and the support surface, forms an angle in relation to the second structure, or an angle x in relation to the support surface when the gripper device is positioned parallel to the support surface (i.e. when the vertical axis of the gripper device is perpendicular to the support surface). In one embodiment, this angle x may be in the range of $0<x<90°$, e.g. $35°<x<60°$, where the larger the angle is, the more compact is the gripper device.

Moreover, the location of the at least one outwardly protruding part and the shape of the first and the second parts are such that after penetrating between the item and the support surface, which may be referred as a "closing position" of the gripper device, the at least one outwardly protruding part engages with the first part and prevents it from moving back to the "open position".

In one embodiment, the first part further includes a rear section, and where the pivotal connection between the first and the second interconnected parts is positioned between the front and the rear section of the first part.

In one embodiment, the at least one jaw further comprises a driving arm mounted to the second part operated by a driving unit for moving the at least one jaw. The driving unit may include any type of driving unit that may e.g. be a pneumatically, mechanically or electrically driven, for moving the at least one jaw from the "open position" to the "closing position", and vice versa, via the driving arm. As already addressed, the driving unit may be considered as being or contributing to the external force needed to prevent the at least one jaw from moving back to the "open position" after picking up the item, i.e. the driving unit is among other things configured to maintain the at least one jaw in the "closing position", i.e. while holding the item while being re-positioned, e.g. put into a tray.

In one embodiment, the gripper device further comprises at least one rigid arm mounted to the base, wherein the at least one belt of flexible material is attached to the at least one rigid arm and is wrapped around the first part. Accordingly, a simple solution is provided to ensured that no relative sliding movement between the sandwiched portion of the at least one belt and the item takes place and thus it is possible to pick up extremely thin items, e.g. a slice of cheese, slice of meant product, fish etc.

In one embodiment, each of the first and the second interconnected parts is an integral part, e.g. made in a 3D printer as previously mentioned.

In one embodiment, the gripper device further comprises a counter hold configured to engage with an upper part of the item, either simultaneously, or before the at least one jaw moves below the item. It is thus ensured that the item is stationary and does not move while being picked up by the gripper device. The counter hold may particularly include a flexible or elastically compressible element which can deform to exert a force in a direction towards the support surface. During such a deformation, potential energy is stored and used for providing pressure in a direction towards the support surface such that the item is pressed against the support surface while being picked up.

In one embodiment, the first part is divided into at least two operatively connected sub-parts. It is thus possible to adapt the gripping to e.g. very irregular surface shapes due to the enhanced elasticity of the first part.

In one embodiment, the at least one jaw comprises at least one plate portion having a free end, where the free end defines at least the leading edge.

In the embodiment discussed above, the at least one jaw may include a single jaw for picking up the item. The gripper device may, in one embodiment, further comprise a support arranged opposingly to the single jaw to provide an opposite force while picking up the item so as to facilitate picking up the item.

In one embodiment, the at least one jaw comprises a pair of jaws arranged such that when the jaws are moved towards each other the leading edges of the jaws move towards each other from an open position to a closing position.

The item may be, but is not limited to, any type of food items such as pieces of meat, poultry meat, cheese, fish etc.

Further, while picking up the items, they may be transferred by e.g. a conveyor means such as a regular conveyor where the support surface is simply the conveyor surface, or the items may be stationary while being picked up.

In a second aspect of the invention, a method is provided for picking up and re-positioning an item carried by a support surface using a pick and place gripper device which comprises:

a base, at least one jaw pivotally mounted to the base having at least one leading edge, at least one belt of flexible material, the method comprising:

wrapping the at least one belt of flexible material around at least the leading edge of the at least one jaw such that it is sandwiched between the at least one jaw and the item when the at least one jaw penetrates below the item and as the at least one jaw moves below the item there is substantially no relative sliding movement between the sandwiched portion of the at least one belt and the item, wherein the leading edge of the at least one jaw, when coming into contact with the support surface, is configured to adjust to the support surface when penetrating between the item and the support surface.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 2A:
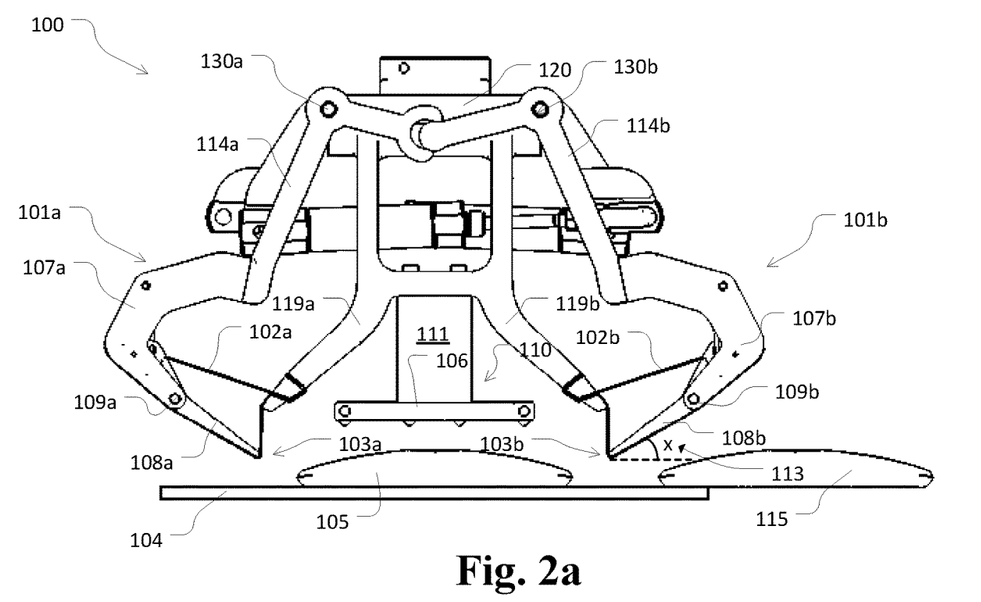
FIGS. 2 to 6 depict graphically an embodiment of a gripper device according to the present invention.

FIG. 2a,b to 6a,b depict graphically a front view and a perspective view of an embodiment of a gripper device according to the present invention.

Figure 2B:
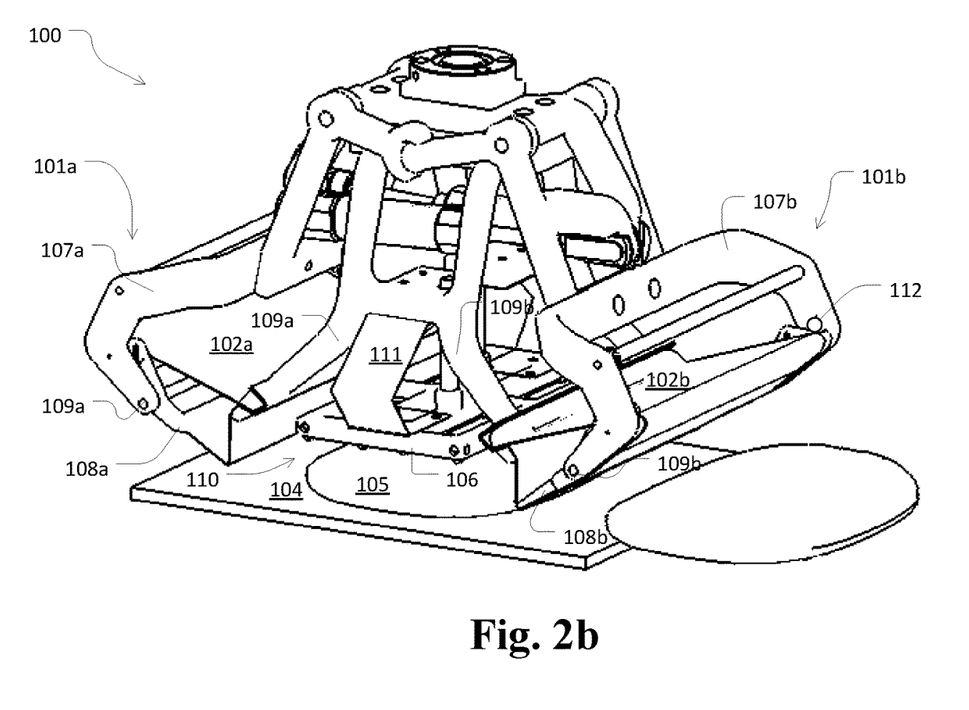

FIG. 2a,b show the gripper device 100 in an open position approaching an item 105 resting on a support surface 104 to be picked up, where the gripper device 100 comprises a base 120, two jaws 101a,b pivotally mounted to the base having leading edges 103a,b where, at each jaw 101a,b, a belt of flexible material 102a,b is wrapped around at least the leading edge of the at least one jaw.

In the embodiment shown here each of the jaws comprises a first part 108a,b and a second part 107a,b that are connected together via a pivotal connection 109a,b, where the first part 108a,b includes a front section defining the leading edge 103a,b of the jaws 101a. b.

The gripper device 100 further comprises a pair of rigid arms 119a,b mounted to the base and where the belts of flexible material 102a,b are attached to the pair of rigid arms 119a,b and are wrapped around the first parts as shown here. This is to ensure that while picking up the item 105, as depicted in FIGS. 3-6, where the belts of flexible material 102a,b are sandwiched between the respective jaw (i.e. the first parts 108a,b) and the item 105, when the jaws 101a,b penetrate below the item, and as the at least one jaw moves below the item towards each other, there is substantially no relative sliding movement between the sandwiched portion of the belts 102a,b and the item 105.

The first part 108a,b has a rear section, and said pivotal connection 109a,b between the first 108a,b and the second 107a,b interconnected parts is positioned between the front and the rear section of the first part. In the exemplary embodiment shown here, the second part 107a,b comprises opposingly arranged arm-like structures having free ends for pivotally connecting the second parts to the first parts. In one embodiment, the first part 108 a,b has an L shape with a first section joined to a second section a nearly 90 degrees angle, e.g. in a 80-100 degrees angle. One of the two sections is connected to the second part 107 and the other of the two sections forming a free jaw end to be moved below the item.

Figure 7:
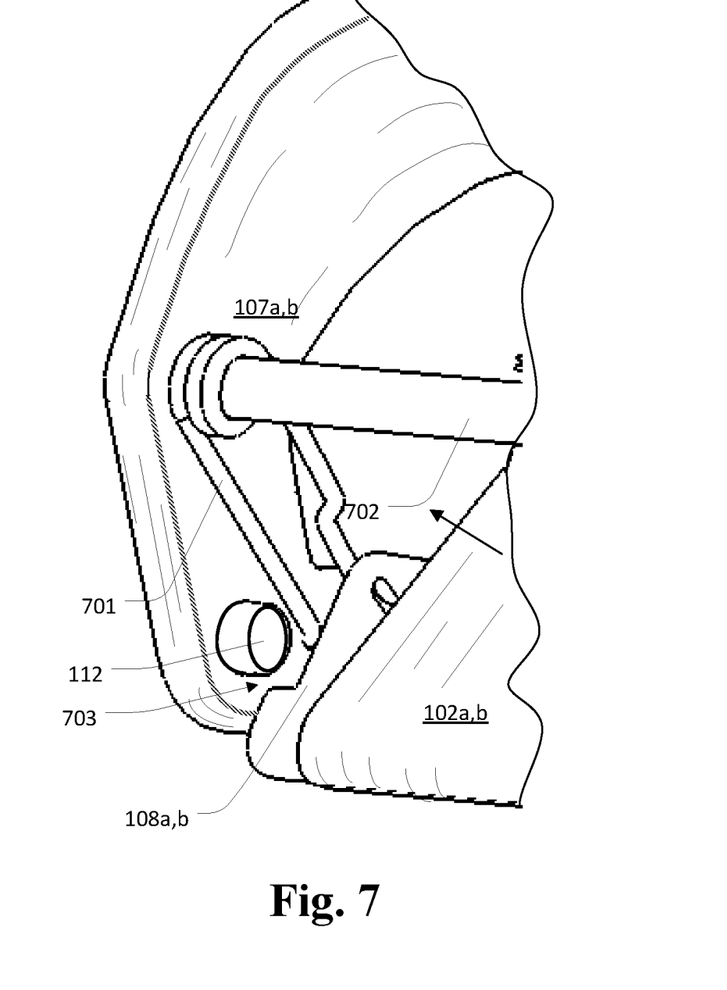
FIG. 7 shows a zoomed up view of a spring load system comprised in the gripper device in FIGS. 2-6.

As will be shown and discussed in more details in relation to FIG. 7, the first and the second parts are preferably further connected together via a spring load for supplying spring load force around the pivotal connection between the first 108a,b and the second 107a,b parts such that the front section of the first part has a tendency to point away from the base to an open gripper position. Moreover, the second parts 107a,b comprise means 112, which in this case is an outwardly protruding structure, configured to interact with the first part so as to provide a counter force opposite to the spring force. Thus, the first parts 108a,b of the jaws 101a,b are bendable in relation to the second parts 107a,b via the interplay between the outwardly protruding structures and the spring load system. This will be discussed in more details later in relation to FIGS. 3-6.

As shown here, at least a part of the front section of the first part 108a,b extending from the leading edges 103a,b comprise a flat plate structure, where the flat plate structure may be a stiff structure or a structure made of stiff material. The open position of the gripper device 100 shown in FIG. 2a,b, which may also be referred to as the "rest position" or the "open position" of the gripper device 100, has an angular position x, 113, in relation to the support surface, but this angular position x may be different from what is shown here, e.g. be in the range 0°<x<90°, such as be more steep than shown here to make the gripper device 100 more compact. This means that an adjacent item 115 may be placed closer to the item 105 meaning that less space is needed and the throughput of the gripper device 100 may be increased.

The opening/closing of the gripper device 100 is driven by a driving unit via driving arms 114a,b mounted to the second parts, or that may be an integral part of the second parts 107a,b, where the driving unit may e.g. be pneumatically driven.

Although the first 108a,b and the second 107a,b parts are shown here as separate parts that are pivotally connected together, these parts may also be integral parts made of a single piece material that may e.g. be printed by a 3 dimensional (3D) printer, i.e. each of the jaws 101a,b may be made of a 3D printed piece. Also, the stiffness of the single piece jaw may be adjusted to the implementation of the jaws 101a,b, e.g. where the leading edges 101a,b and the flat part extending from the leading edges may e.g. be stiffer than the remaining part of the jaws 101a,b. As an example a given area of each of the single piece jaws may be softer of have high elasticity and thus acting as a kind of a pivot points for the jaws.

The embodiment shown here further comprise a counter hold 110 comprising a plate structure 106 connected to two opposingly arranged flexible members 111 attached to the frame structure 120 configured to engage with an upper part of the item 105 while picking it up so as to ensure that the item is stationary and does not move while being picked up by the gripper device. It should be noted that the counter hold should not be construed as being limited to said plate structure, but may just as well comprise any means for providing downwardly pointing force, e.g. blowing-off system and the like.

Figure 3A:
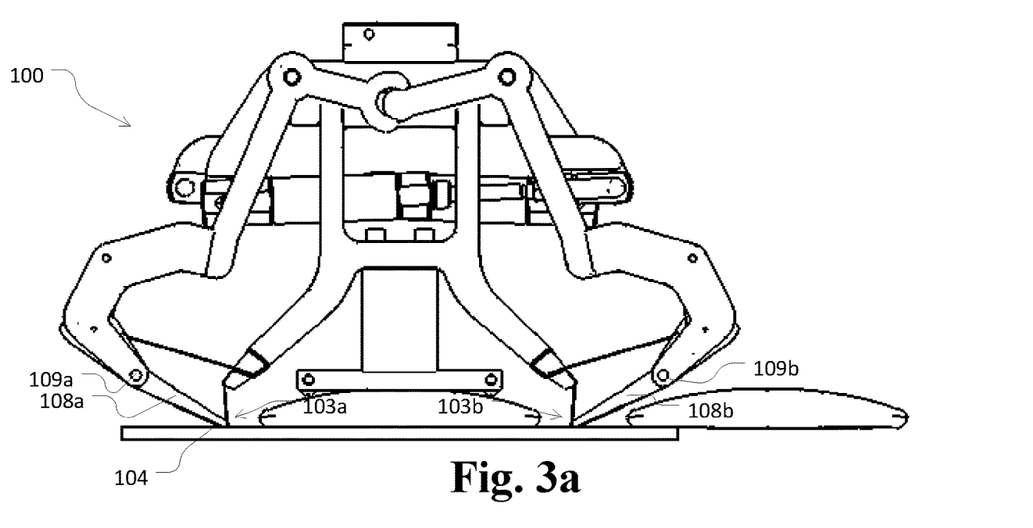
Figure 3B:
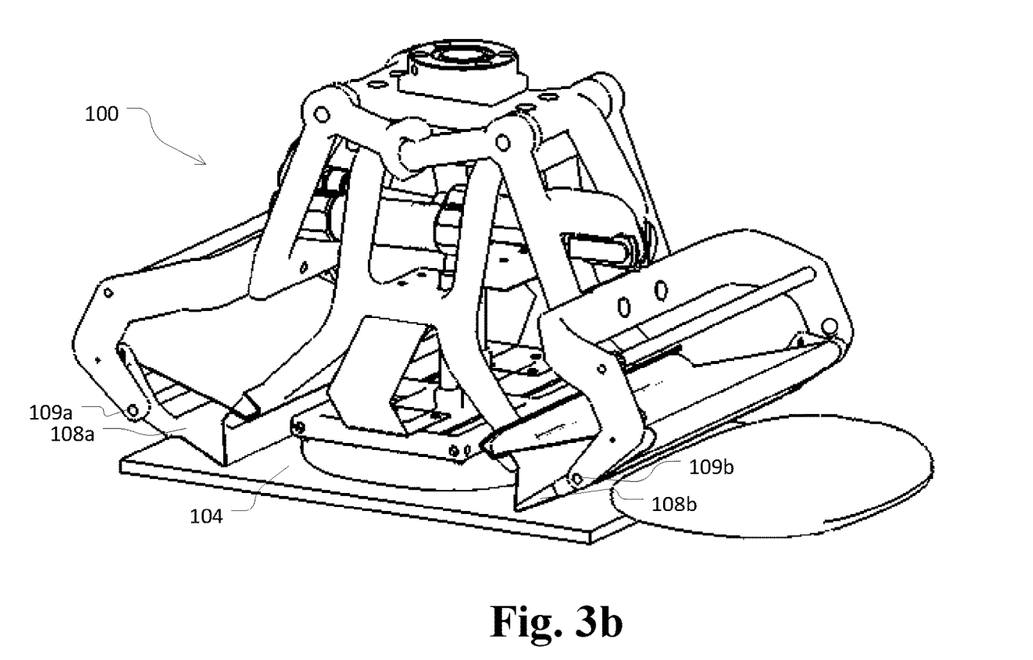
Figure 4A:
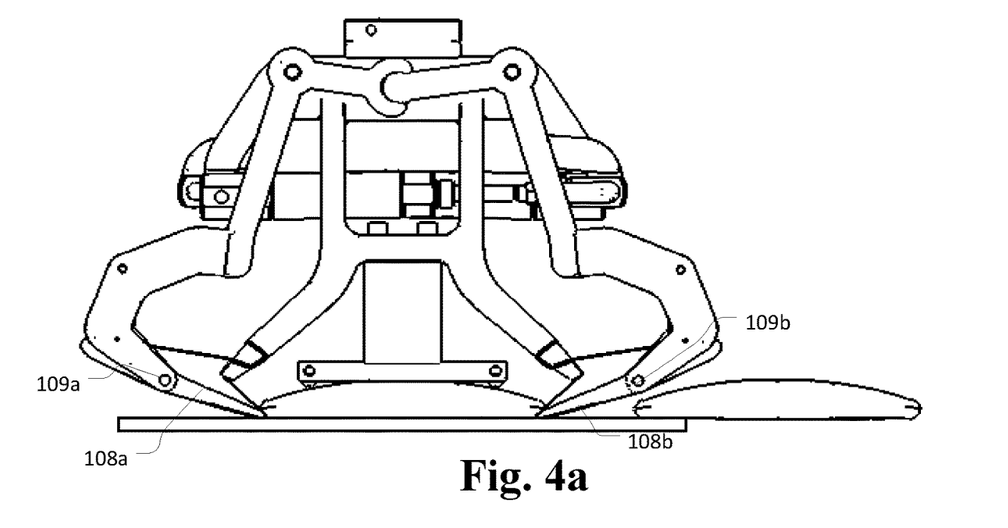
Figure 4B:
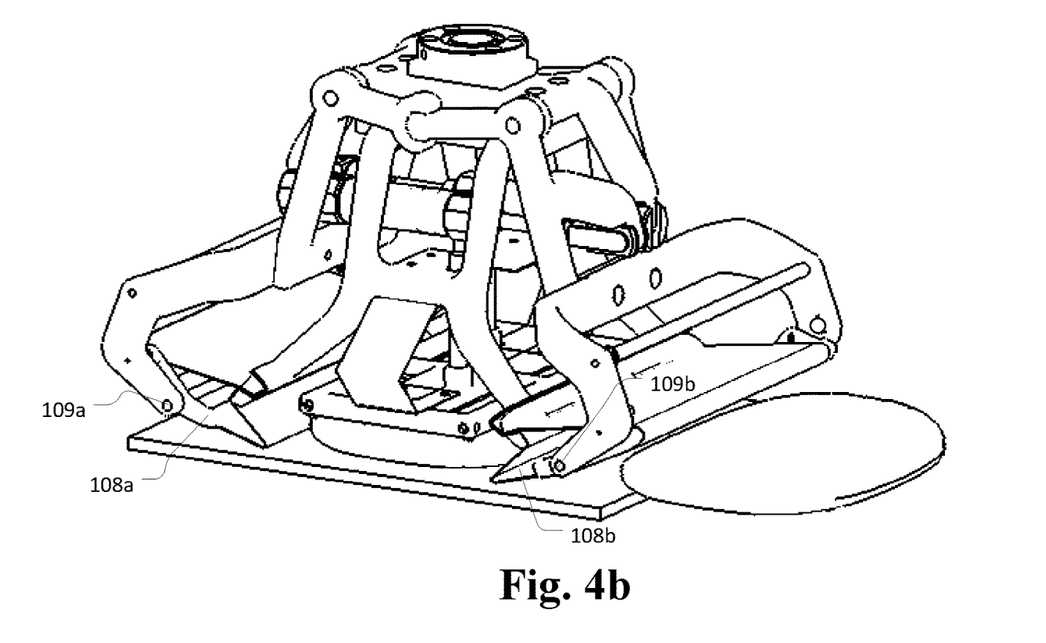
Figure 5A:
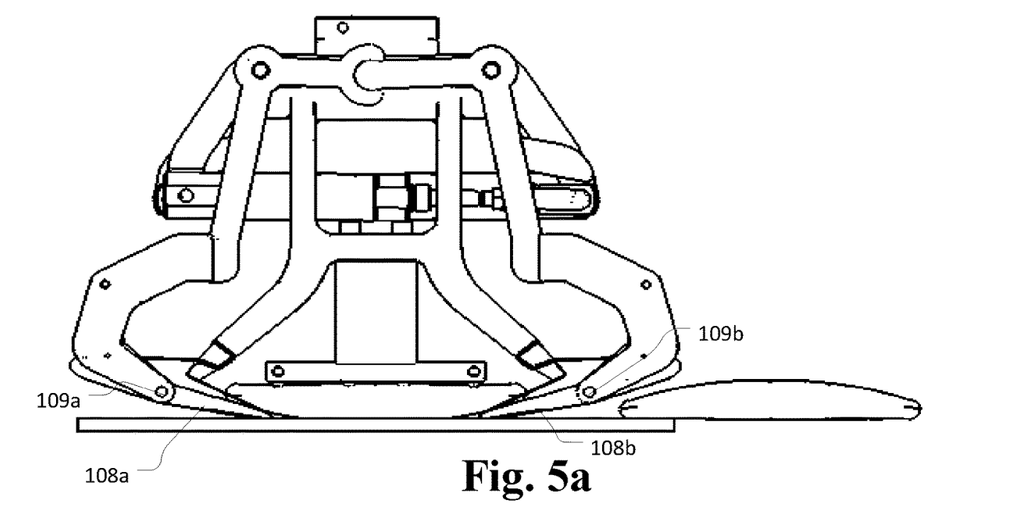
Figure 5B:
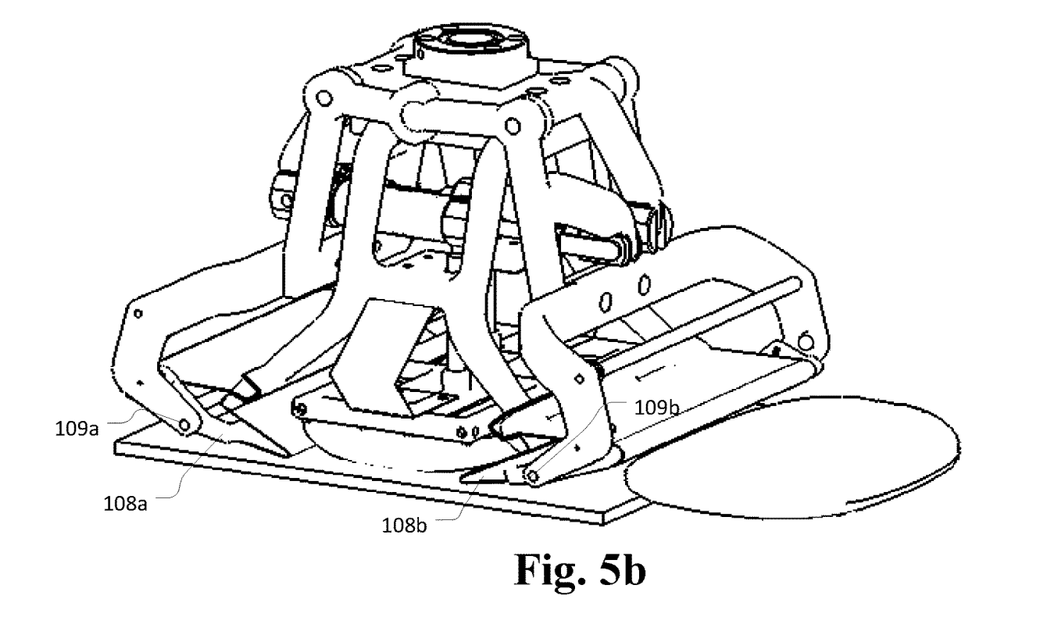
Figure 6A:
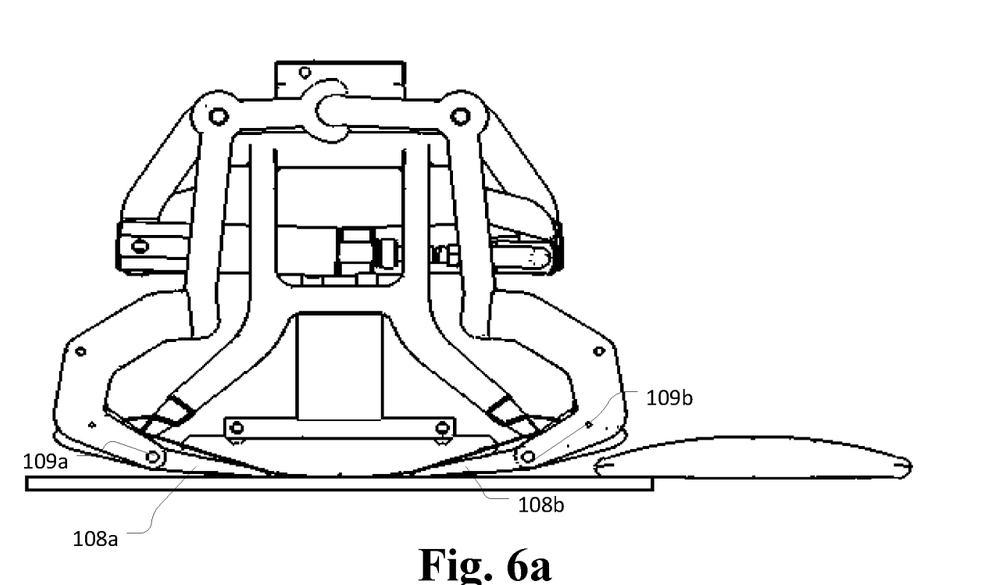
Figure 6B:
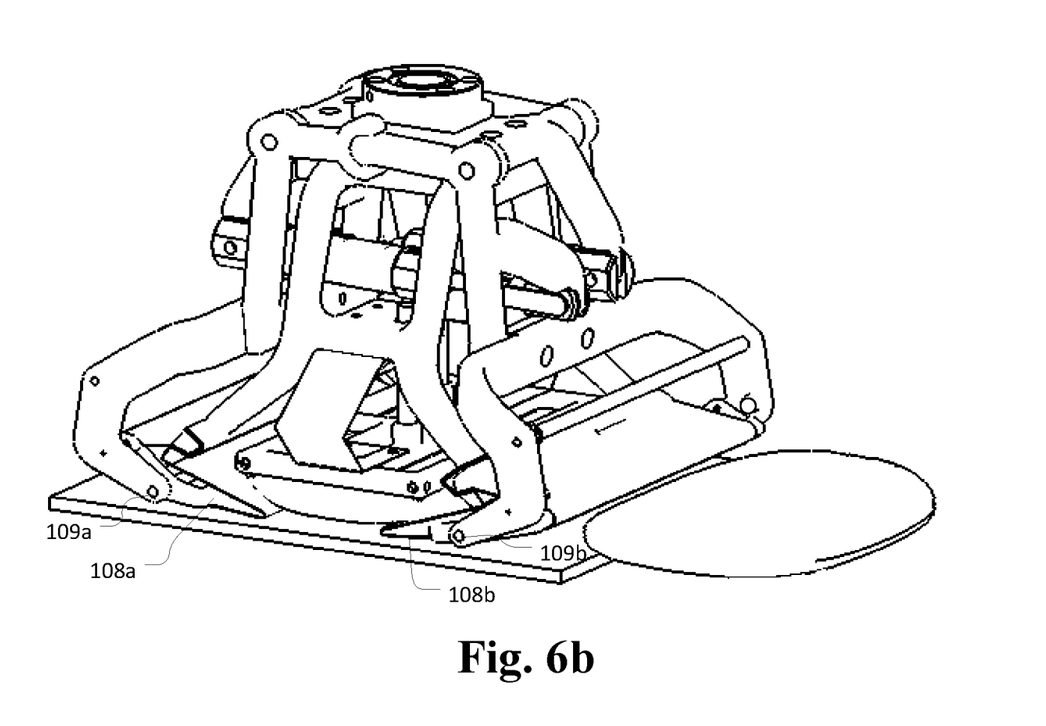

FIGS. 3a,b show where the gripper device 100, i.e. the leading edges 103a,b of the first part 108a,b in FIG. 2a,b come into contact with the support surface 104 initiating a rotation movement of the first part 108a,b around the pivot points 109a,b, which is better reflected in FIGS. 4a,b-6a,b showing clearly how the angular position of the first parts 108a,b changes in relation to the second parts and adapts to the support surface such that it provides a scraping effect when the gripper device penetrates under the item to be picked up.

FIG. 7 shows a zoomed up view of the spring load system 701 and the means configured to interact, i.e. in the case the outwardly protruding structure 112 extending from the second part configured to interact with the rear section of the first part 108a,b. The spring load system 701 shown here comprises a spring that is rigidly mounted to the second part 107a,b, e.g. via the rod 702 extending between opposite sides of the second part 107a,b, or it may simply be rigidly mounted direction to the second part 107a,b (not shown here).

As shown here, an external force e.g. from an operator or from a support surface is exerted onto the first part 102a,b causing the first part to bend away from the second part 107a,b creating a spacing 703 between the outwardly protruding structure 112 and the first part 102a,b. Accordingly, and as already discussed previously, in the absence of such an external force the first part interacts with the protruding structure 112 giving it an initial angular position as depicted in FIG. 2a,b.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A pick and place gripper device for picking up and re-positioning an item carried by a support surface, comprising:
   a base,
   at least one jaw pivotally mounted to the base and having at least one leading edge,
   at least one belt of flexible material being wrapped around at least the at least one leading edge of the at least one jaw such that at least part of the at least one belt of flexible material becomes sandwiched between the at least one jaw and the item when the at least one jaw penetrates below the item, where the at least one belt of flexible material is arranged such that when the at least one jaw moves below the item there is substantially no relative sliding movement between a sandwiched part of the at least one belt of flexible material and the item, wherein the at least one leading edge of the at least one jaw, when coming into contact with the support surface, is configured to adjust to the support surface when penetrating between the item and the support surface;
   wherein the at least one jaw comprises a first part and a second part pivotally connected together at a pivot point axis via a spring load for supplying a force at the pivot point axis between the first and the second parts forcing a front section of the first part to point away from the base, the front section defining the leading edge of the at least one jaw.

2. The pick and place gripper device according to claim 1, wherein the second part comprises means configured to interact with the first part acting as a stopper to the first part for limiting the movement of the first part away from the base.

3. The pick and place gripper device according to claim 2, wherein the second part comprises opposingly arranged arm-like structures having ends for pivotally connecting the second part to the first part, and wherein the means configured to interact with the first part comprises at least one outwardly protruding structure extending from the second part.

4. The pick and place gripper device according to claim 1, wherein the first part further includes a rear section, and wherein the pivot point axis between the first and the second parts is positioned between the front and the rear section of the first part.

5. The pick and place gripper device according to claim 1, wherein the at least one jaw further comprises a driving arm mounted to the second part operated by a driving unit for moving the at least one jaw.

6. The pick and place gripper device according to claim 1, further comprising at least one structure mounted to the base, wherein the at least one belt of flexible material is attached to the at least one structure and is wrapped around the first part.

7. The pick and place gripper device according to claim 1, wherein each of the first and the second parts is an integral part.

8. The pick and place gripper device according to claim 1, further comprising a counter hold configured to engage with an upper part of the item either simultaneously or before the at least one jaw moves below the item.

9. The pick and place gripper device according to claim 8, wherein the counter hold is elastically compressible to exert a force in a direction towards the support surface.

10. The pick and place gripper device according to claim 1, wherein the first part is divided into at least two operatively connected sub-parts or is flexible along the at least one leading edge.

11. The pick and place gripper according to claim 1, wherein the at least one jaw comprises at least one plate portion having a free end, wherein the free end defines the at least one leading edge.

12. The pick and place gripper device according to claim 1, wherein the at least one jaw comprises a pair of jaws arranged such that when the jaws are moved towards each other, leading edges of the jaws move towards each other from an open position to a closing position.

13. A method for picking up and re-positioning an item carried by a support surface using a pick and place gripper device which comprises:
   a base,
   at least one jaw pivotally mounted to the base and having at least one leading edge, and
   at least one belt of flexible material,
the method comprising:
wrapping the at least one belt of flexible material around at least the at least one leading edge of the at least one jaw such that at least part of the at least one belt of flexible material becomes sandwiched between the at least one jaw and the item when the at least one jaw penetrates below the item and as the at least one jaw moves below the item, wherein the at least one belt of flexible material is arranged such that there is substantially no relative sliding movement between a sandwiched portion of the at least one belt of flexible material and the item,
wherein the at least one leading edge of the at least one jaw, when coming into contact with the support surface, is configured to adjust to the support surface when penetrating between the item and the support surface;
wherein the at least one jaw comprises a first part and a second part pivotally connected together at a pivot point axis via a spring load for supplying a force at the pivot point axis between the first and the second parts forcing a front section of the first part to point away from the base, the front section defining the leading edge of the at least one jaw.

14. The pick and place gripper device for picking up and re-positioning an item carried by a support surface according to independent claim 1, wherein the spring load is provided by a spring mechanism.

* * * * *